United States Patent
Tsuiki et al.

(10) Patent No.: US 7,602,868 B2
(45) Date of Patent: Oct. 13, 2009

(54) ASYNCHRONOUS TRANSMISSION DEVICE, ASYNCHRONOUS TRANSMISSION METHOD

(75) Inventors: Jun Tsuiki, Kawasaki (JP); Masao Koyabu, Kawasaki (JP); Masahiro Kuramoto, Kawasaki (JP); Junichi Inagaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 401 days.

(21) Appl. No.: 11/341,605

(22) Filed: Jan. 30, 2006

(65) Prior Publication Data

US 2007/0116165 A1    May 24, 2007

(30) Foreign Application Priority Data

Oct. 20, 2005    (JP)    ............................. 2005-305947

(51) Int. Cl.
*H04L 7/00*    (2006.01)
(52) U.S. Cl. ..................................... 375/354
(58) Field of Classification Search .................. 375/354
See application file for complete search history.

(56) References Cited

U.S. PATENT DOCUMENTS

| 5,054,020 | A | * | 10/1991 | Meagher | 370/305 |
| 5,256,994 | A | * | 10/1993 | Langendorf | 331/16 |
| 5,450,458 | A | * | 9/1995 | Price et al. | 375/356 |
| 5,914,963 | A | * | 6/1999 | Basile | 714/700 |
| 6,105,144 | A | * | 8/2000 | Wu | 713/401 |
| 6,112,307 | A | * | 8/2000 | Ajanovic et al. | 713/400 |
| 6,456,677 | B1 | * | 9/2002 | Hiramatsu et al. | 375/354 |
| 6,516,362 | B1 | * | 2/2003 | Magro et al. | 710/58 |
| 6,622,255 | B1 | * | 9/2003 | Kurd et al. | 713/503 |
| 6,628,276 | B1 | * | 9/2003 | Elliott | 345/213 |
| 6,662,305 | B1 | * | 12/2003 | Salmon et al. | 713/401 |

(Continued)

FOREIGN PATENT DOCUMENTS

JP    1-128636 A    5/1989

(Continued)

OTHER PUBLICATIONS

Ginosar, "Fourteen ways to fool your synchronizer", 2003 Proceedings of the Ninth International Symposium on Asynchronous Circuits and Systems, May 12-15, 2003 pp. 89-96.*

(Continued)

*Primary Examiner*—Juan A Torres
(74) *Attorney, Agent, or Firm*—Arent Fox LLP.

(57) ABSTRACT

The present invention provides an asynchronous transmission device and asynchronous transmission method which reduce the synchronization processing overhead. The asynchronous transmission device that receives at least one notification signal in accordance with a reception clock, the notification signal being transmitted in accordance with a transmission clock, includes a trigger signal transmission unit that outputs a trigger signal which is based on the symbol period of the notification signal, a notification signal transmission unit that outputs a notification signal which has its timing staggered by a predetermined time period with respect to the timing of the trigger signal output from the trigger signal transmission unit, a trigger signal synchronization unit that synchronizes the trigger signal, and outputs a sampling timing signal which indicates the sampling timing of the notification signal, and a notification signal retention unit that retains the notification signal in accordance with the sampling timing.

8 Claims, 2 Drawing Sheets

U.S. PATENT DOCUMENTS

| | | | |
|---|---|---|---|
| 7,424,059 B2 * | 9/2008 | Okada | 375/257 |
| 7,460,630 B2 * | 12/2008 | Kato et al. | 375/372 |
| 2002/0031042 A1 * | 3/2002 | Kim et al. | 365/233 |
| 2002/0196886 A1 * | 12/2002 | Adkisson | 375/362 |
| 2004/0202253 A1 | 10/2004 | Hanibuchi | |

FOREIGN PATENT DOCUMENTS

| | | | |
|---|---|---|---|
| JP | 01128636 A * | 5/1989 | |
| JP | 10-135938 A | 5/1998 | |
| JP | 11-154938 A | 6/1999 | |
| JP | 2004-310544 A | 11/2004 | |

OTHER PUBLICATIONS

Semiat, "Timing measurements of synchronization circuits", 2003 Proceedings. Ninth International Symposium on Asynchronous Circuits and Systems, May 12-15, 2003 pp. 68-77.*

* cited by examiner

ASYNCHRONOUS TRANSMISSION DEVICE, ASYNCHRONOUS TRANSMISSION METHOD

BACKGROUND OF THE INVENTION

1. Field of the Invention

The present invention relates to an asynchronous transmission device and asynchronous transmission method which transmit information between circuits having different clocks.

2. Description of Related Art

In an asynchronous transmission device in which a transmission side circuit transmits a notification signal of an event, etc. to a reception side circuit, in case the transmission side circuit and the reception side circuit operate with clock frequencies different from each other, so as to prevent the reception side circuit from coming into the metastable state, it is necessary to synchronize the notification signal in the reception side circuit.

Firstly, the first conventional asynchronous transmission device will be explained. In the first conventional asynchronous transmission device, a synchronization circuit is used in a reception side circuit for an input notification signal. The synchronization circuit has synchronization FFs (Flip-Flops) of suitable number of stages which are serially connected, and performs re-timing using a reception clock to synchronize the input notification signal.

When the number of stages of synchronization FFs is increased, the probability of synchronization failure can be decreased, while the synchronization processing overhead is increased. The synchronization processing overhead is a latency between a notification signal transmitted from a transmission side circuit and a notification signal retained to a reception side circuit, and is a latency corresponding to the number of stages of synchronization FFs. Accordingly, the number of stages of synchronization FFs, which is the number of stages of FFs necessary for synchronization, is set to be the minimum value satisfying the allowable probability of synchronization failure. For example, in case the clock frequency is several hundred MHz, the number of stages of synchronization FFs is set to be approximately three to five.

In case there exist a plurality of notification signals from a transmission side circuit to a reception side circuit, the reception side circuit has above-described synchronization circuits for the respective input notification signals.

As a conventional technique related to the present invention, there is known a patent document 1 (Jpn. Pat. Appln. Laid-Open Publication No. 01-128153). In a control signal transmission system between asynchronous devices, a transmission side device transmits a trigger signal indicating that writing a control signal to be transmitted to a transmission register is ended, while a reception side device performs gating for the input control signal using the trigger signal which is synchronized by a synchronization circuit.

However, when employing above-described synchronization circuit, the synchronization processing overhead comes to be at least a latency corresponding to the number of stages of synchronization FFs.

SUMMARY OF THE INVENTION

It is therefore an object of the present invention to overcome the above-mentioned drawbacks by providing an asynchronous transmission device and asynchronous transmission method which can reduce the synchronization processing overhead.

To solve above-described problems, the present invention provides an asynchronous transmission device that receives at least one notification signal in accordance with a reception clock, the notification signal being transmitted in accordance with a transmission clock, including: a trigger signal transmission unit that outputs a trigger signal which is based on the symbol period of the notification signal; a notification signal transmission unit that outputs a notification signal which has its timing staggered by a predetermined time period with respect to the timing of the trigger signal output from the trigger signal transmission unit; a trigger signal synchronization unit that synchronizes the trigger signal, and outputs a sampling timing signal which indicates the sampling timing of the notification signal; and a notification signal retention unit that retains the notification signal in accordance with the sampling timing.

According to the asynchronous transmission device of the present invention, the period of the sampling timing signal is equal with one symbol time length of the notification signal.

According to the asynchronous transmission device of the present invention, the trigger signal is a signal which has its value changed every period of the sampling timing signal, and the trigger signal synchronization unit has a plurality of synchronization FFs which are serially connected, detects the change timing of the synchronized trigger signal, and outputs the result as the sampling timing signal.

According to the asynchronous transmission device of the present invention, the trigger signal synchronization unit detects the change timing by performing EOR operation for, among the plural synchronization FFs, an output of the last synchronization FF and an output of the second last synchronization FF.

The present invention also provides an asynchronous transmission method that receives at least one notification signal in accordance with a reception clock, the notification signal being transmitted in accordance with a transmission clock, including: a trigger signal transmission step that outputs a trigger signal which is based on the symbol period of the notification signal; a notification signal transmission step that outputs a notification signal which is delayed by a predetermined time period with respect to the trigger signal; a trigger signal synchronization step that synchronizes the trigger signal, and outputs a sampling timing signal which indicates the sampling timing of the notification signal; and a notification signal retention step that retains the notification signal in accordance with the sampling timing.

According to the asynchronous transmission method of the present invention, the period of the sampling timing signal is equal with one symbol time length of the notification signal.

According to the asynchronous transmission method of the present invention, the trigger signal is a signal which has its value changed every period of the sampling timing signal, and the trigger signal synchronization step detects the change timing of the trigger signal synchronized by a plurality of synchronization FFs which are serially connected, and outputs the result as the sampling timing signal.

According to the asynchronous transmission method of the present invention, the trigger signal synchronization step detects the change timing by performing EOR operation for, among the plural synchronization FFs, an output of the last synchronization FF and an output of the second last synchronization FF.

According to the present invention, the number of synchronization FFs of the entire device can be made small, and the synchronization processing overhead can be reduced.

DETAILED DESCRIPTION OF THE PREFERRED EMBODIMENTS

The present invention will further be described below with reference to the accompanying drawings.

Figure 1:
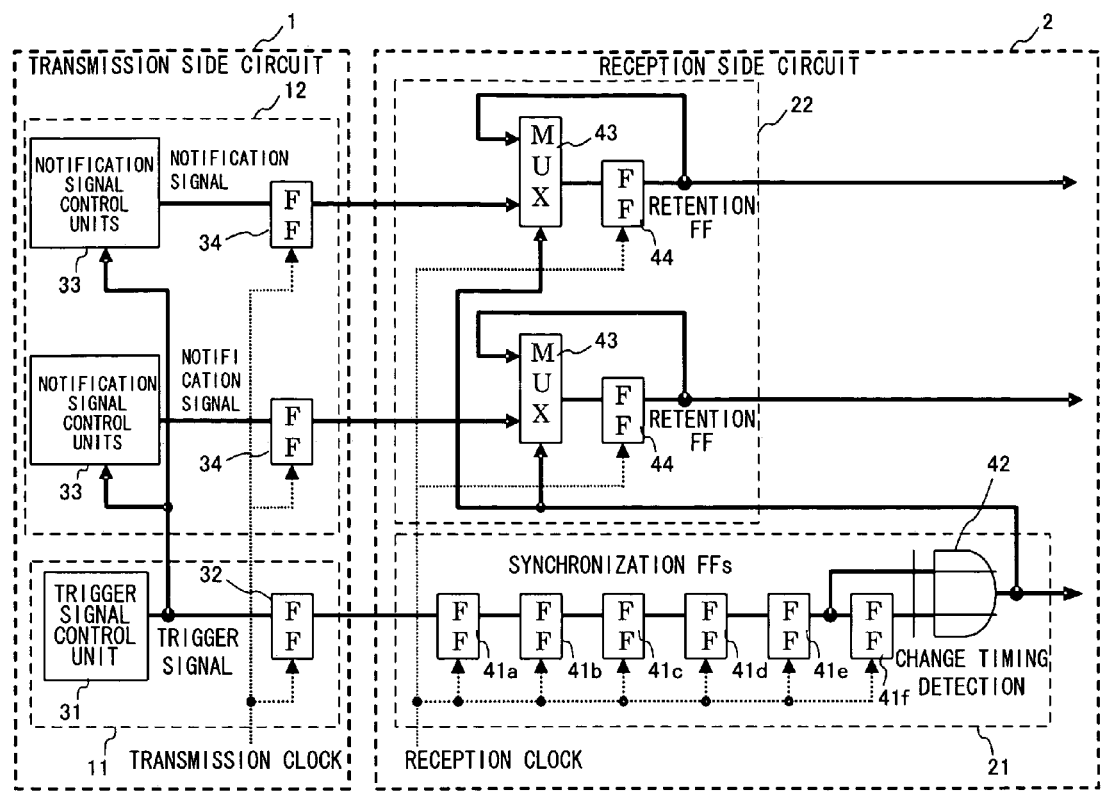
FIG. 1 shows a block diagram indicative of one example of the configuration of the asynchronous transmission device according to the present invention.

Firstly, the configuration of the asynchronous transmission device will be explained. FIG. 1 shows a block diagram indicative of one example of the configuration of the asynchronous transmission device of the present invention. The asynchronous transmission device includes a transmission side circuit 1 and a reception side circuit 2. In the present embodiment, a notification signal is transmitted from the transmission side circuit 1 to the reception side circuit 2 in two lines in parallel. Furthermore, the transmission side circuit 1 includes a trigger signal transmission unit 11 and a notification signal transmission unit 12. Moreover, the reception side circuit 2 includes a trigger signal synchronization unit 21 and a notification signal retention unit 22.

The trigger signal transmission unit 11 includes a trigger signal control unit 31 and a sending FF 32. The notification signal transmission unit 12 includes notification signal control units 33 for each notification signal, and sending FFs 34 for each notification signal. The trigger signal synchronization unit 21 includes synchronization FFs 41a, 41b, 41c, 41d, 41e, 41f, and a change timing detection unit 42. In the present embodiment, the number of stages of synchronization FFs, which is the number of stages of FFs necessary for synchronization, is set to be five. The number of synchronization FFs is set to be six, which number is obtained by adding one to the number of stages of synchronization FFs. The notification signal retention unit 22 includes multiplexers 43 and retention FF's 44.

The performance of the transmission side circuit 1 will be explained. The trigger signal control unit 31 inverts every three transmission clock cycles, and outputs a trigger signal in which "0" and "1" appear alternately. The notification signal control units 33 output a notification signal which has its one symbol length set to be three transmission clock cycles, which is equal with a time period every which period the value of the trigger signal changes, respectively. Furthermore, the notification signal control units 33 give a delay of a predetermined time period to the notification signal with respect to the timing of the trigger signal output from the trigger signal control unit 31, respectively. The sending FF 32 retains and outputs the trigger signal every one transmission clock cycle. Similarly, the sending FFs 34 retain and output the notification signal every one transmission clock cycle.

Next, the performance of the reception side circuit 2 will be explained. In the trigger signal synchronization unit 21, the synchronization FFs 41a, 41b, 41c, 41d, 41e, 41f synchronize the trigger signal. Furthermore, the change timing detection unit 42 performs EOR operation for an output of the fifth synchronization FF 41e, which is surely synchronized, and an output of the sixth synchronization FF 41f, and outputs the result as a sampling timing signal. Specifically, in case the output of the synchronization FF 41e and the output of the synchronization FF 41f are different from each other due to the change of the trigger signal, the sampling timing signal comes to be "1", while in the other cases, the sampling timing signal comes to be "0".

Moreover, in the notification signal retention unit 22, the multiplexers 43 select an input in accordance with the sampling timing signal, respectively. Specifically, when the sampling timing signal is "1", the multiplexers 43 select and output the notification signal sent from the transmission side circuit 1. On the other hand, when the sampling timing signal is "0", the multiplexers 43 select and output an output sent from each of the retention FFs 44. Furthermore, the retention FFs 44 retain and output an output of each of the multiplexers 43 every one reception clock cycle, respectively.

Next, a specific example of a timing chart of the asynchronous transmission device according to the present invention will be explained.

In the present embodiment, the clock frequency of transmission clock and the clock frequency of reception clock are different, and the ratio of those clock frequencies are set to be 3:4. The periods of the trigger signal and the notification signal are three cycles in transmission clock and four cycles in reception clock.

Firstly, the first specific example will be explained. As parameters for calculating the synchronization processing overhead, notification signal delay cycle number, number of stages of synchronization FFs, take-in time, and sampling timing signal period will be explained. The notification signal delay cycle number indicates by what number of reception clock cycles the notification signal to be output from the notification signal control units 33 is delayed with respect to the timing of the trigger signal output from the trigger signal control unit 31. The number of stages of synchronization FFs indicates the number of stages of FFs necessary for synchronization. The take-in time indicates by what number of reception clock cycles the notification signal is delayed by the retention FFs 44. The sampling timing signal period indicates to what number of reception clock cycles the period of the sampling timing signal corresponds.

In the first specific example, the notification signal delay cycle number is set to be three, the number of stages of synchronization FFs is set to be five, which number is obtained by subtracting one from six that is the number of synchronization FFs in the trigger signal synchronization unit 21, the take-in time is set to be one, and the sampling timing signal period is set to be four.

Figure 2:
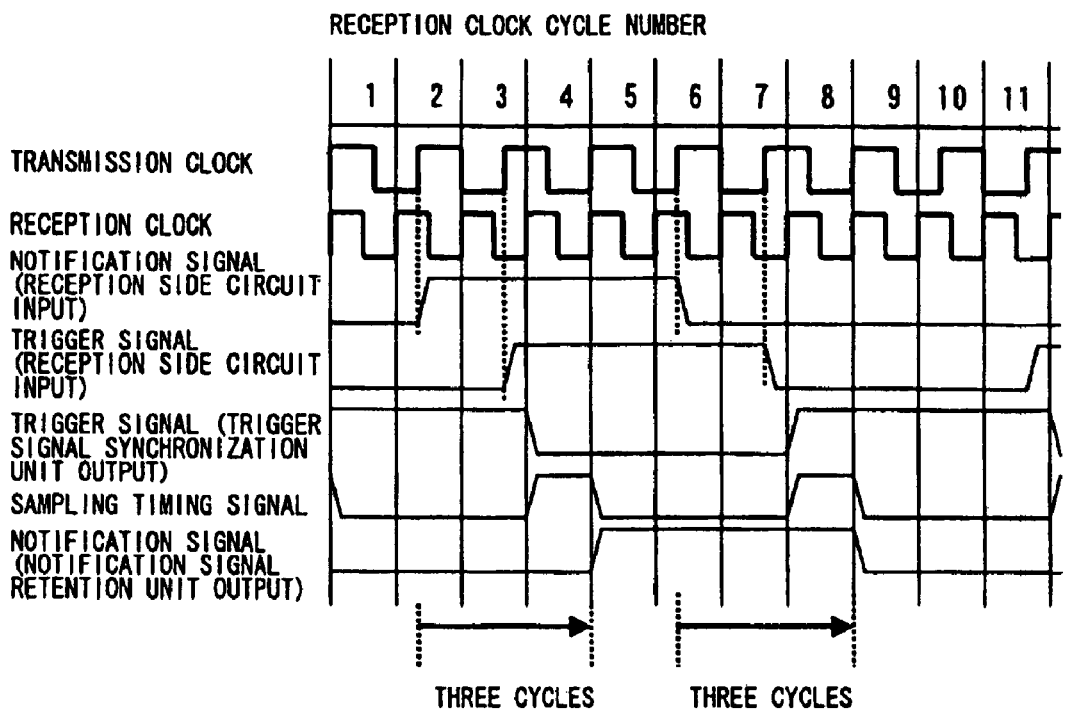
FIG. 2 shows a timing chart indicative of the first specific example of the performance of the asynchronous transmission device according to the present invention.

FIG. 2 shows a timing chart indicative of the first specific example of the performance of the asynchronous transmission device according to the present invention. In this drawing, there are shown waveforms of a transmission clock, a reception clock, a notification signal (reception side circuit input), a trigger signal (reception side circuit input), a trigger signal (trigger signal synchronization unit output), a sample timing signal, a notification signal (notification signal retention unit output), from above, respectively.

As described above, the notification signal (reception side circuit input) is delayed by three reception clock cycles as compared with the trigger signal (reception side circuit input) due to the delay given by the notification signal control units 33. The trigger signal (trigger signal synchronization unit output) is delayed by five reception clock cycles as compared with the trigger signal (reception side circuit input) due to the synchronization processing by the trigger signal synchronization unit 21.

The synchronization processing overhead is the delay from the output timing of the sending FFs 34 to the output timing of the retention FFs 44, and is obtained by the following mathematical expression.

$$\text{Synchronization processing overhead} =$$
$$\begin{pmatrix} -\text{notification signal delay cycle number} + \\ \text{number of stages of synchronization } FFs + \text{take-in time} \end{pmatrix}$$
$$\text{modulo (sampling timing signal period)}$$

Accordingly, the synchronization processing overhead in the first specific example is calculated as follows.

$$\text{Synchronization processing overhead} = (-3 + 5 + 1) \text{modulo } 4$$
$$= 3$$

As described above, according to the first specific example, the synchronization processing overhead can be reduced to three from five that is the conventional value.

Figure 3:
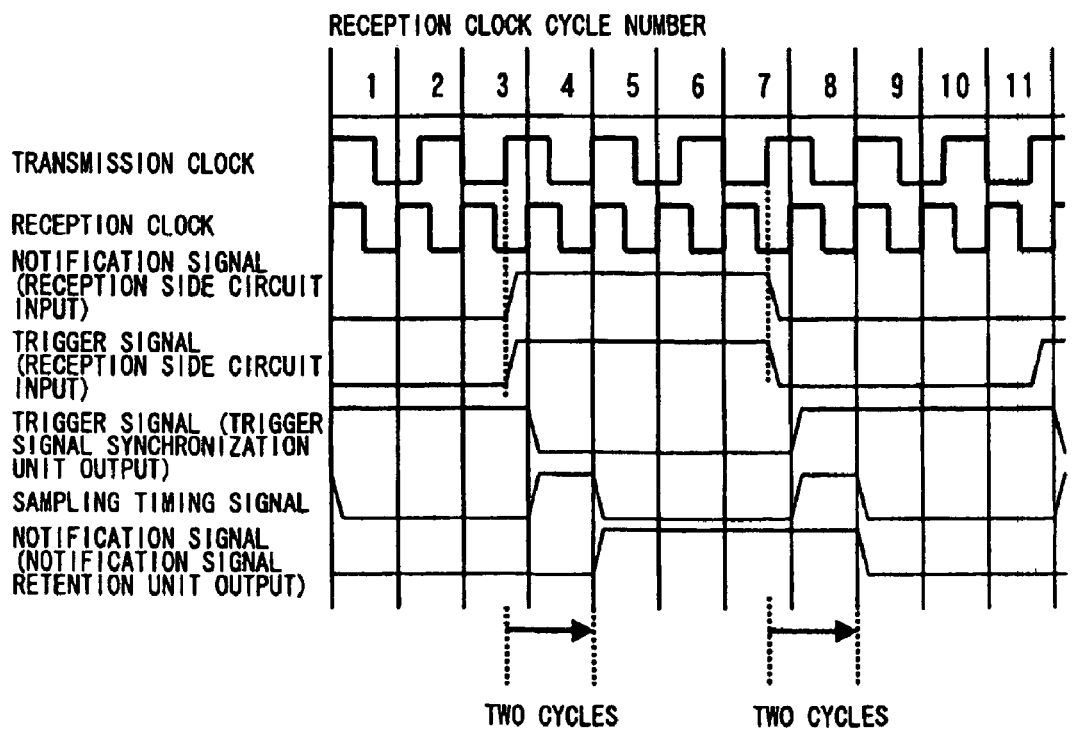
FIG. 3 shows a timing chart indicative of the second specific example of the performance of the asynchronous transmission device according to the present invention.

Next, the second specific example to further reduce the synchronization processing overhead will be explained. In the second specific example, the notification signal delay cycle number is set to be zero reception clock cycle. The number of stages of synchronization FFs, take-in time, and sampling timing signal period are equal with those of the first specific example. FIG. 3 shows a timing chart indicative of the second specific example of the performance of the asynchronous transmission device according to the present invention. Names of respective waveforms shown in FIG. 3 are similar to those shown in FIG. 2. As shown in FIG. 3, there is no stagger between the notification signal (reception side circuit input) and the trigger signal (reception side circuit input) in timing.

Accordingly, the synchronization processing overhead in the second specific example is calculated as follows.

$$\text{Synchronization processing overhead} = (-0 + 5 + 1) \text{modulo } 4$$
$$= 2$$

As described above, according to the second specific example, the synchronization processing overhead can be reduced to two from five that is the conventional value. On the other hand, the synchronization processing overhead becomes larger than the take-in time.

Conventionally, in case of notifying information of a plurality of bits in parallel asynchronously, it is necessary to employ particular value expression such as the gray code counter so as to prevent malfunction due to the cycle stagger among bits at the time of re-timing. According to the present invention, since all bits in information of a plurality of bits are concurrently updated using a reception clock, the information can be notified asynchronously by employing regular simple value expression.

Furthermore, conventionally, when carrying out synchronization processing for a notification signal, since the synchronization FF is necessary for all notification signals, FFs of approximately "information bit number of notification signal×number of stages of synchronization FFs" are necessary in a reception side circuit. On the other hand, according to the present invention, FF's of approximately only "information bit number of notification signal+number of stages of synchronization FFs" are necessary in a reception side circuit, which can significantly reduce the number of FFs as compared with the conventional case.

The asynchronous transmission device according to the present invention can be easily employed in an information processing apparatus and an information communication apparatus, and the performance of the information processing apparatus and information communication apparatus can be improved.

What is claimed is:

1. An asynchronous transmission device that receives at least one notification signal in accordance with a reception clock, the notification signal being transmitted in accordance with a transmission clock, said device comprising:
   a trigger signal transmission unit that outputs a trigger signal which is based on a symbol period of the notification signal;
   a notification signal transmission unit that outputs a notification signal which has its timing staggered by a predetermined time period with respect to the timing of the trigger signal output from the trigger signal transmission unit;
   a trigger signal synchronization unit that synchronizes the trigger signal, and outputs a sampling timing signal which indicates a sampling timing of the notification signal; and
   a notification signal retention unit that retains the notification signal in accordance with the sampling timing;
   wherein the notification signal has a value changing at a constant period;
   the trigger signal has a value changing at the constant period;
   the constant period is a plurality of times of a period of the transmission clock; and
   the trigger signal synchronization unit has a plurality of synchronization flip-flops which are serially connected, detects a change timing of the synchronized trigger signal, and outputs the change timing thus detected as the sampling timing signal.

2. The asynchronous transmission device according to claim 1, wherein
   the sampling timing signal has a period equal to one symbol time length of the notification signal.

3. The asynchronous transmission device according to claim 2, wherein
   the trigger signal is a signal which has its value changed every period of the sampling timing signal.

4. The asynchronous transmission device according to claim 3, wherein
   the trigger signal synchronization unit detects the change timing of the synchronized trigger signal by performing an exclusive-OR operation for, among the plural synchronization flip-flops, an output of the last synchronization flip-flop and an output of the second last synchronization flip-flop.

5. An asynchronous transmission method in which a reception side circuit receives at least one notification signal in accordance with a reception clock, the notification signal being transmitted by a transmission side circuit in accordance with a transmission clock, the method comprising:

a trigger signal transmission step in which the transmission side circuit outputs a trigger signal which is based on a symbol period of the notification signal;

a notification signal transmission step in which the transmission side circuit outputs a notification signal which is delayed by a predetermined time period with respect to the trigger signal;

a trigger signal synchronization step in which the reception side circuit synchronizes the trigger signal, and outputs a sampling timing signal which indicates a sampling timing of the notification signal; and a notification signal retention step in which the reception side circuit retains the notification signal in accordance with the sampling timing;

wherein the notification signal has a value changing at a constant period;

the trigger signal has a value changing at the constant period;

the constant period is a plurality of times of a period of the transmission clock; and in the trigger signal synchronization step, the reception side circuit detects a change timing of the trigger signal synchronized by a plurality of synchronization flip-flops which are serially connected, and outputs the change timing thus detected as the sampling timing signal.

6. The asynchronous transmission method according to claim 5, wherein the sampling timing signal has a period equal to one symbol time length of the notification signal.

7. The asynchronous transmission method according to claim 6, wherein the trigger signal is a signal which has its value changed every period of the sampling timing signal.

8. The asynchronous transmission method according to claim 7, wherein in the trigger signal synchronization step, the reception side circuit detects the change timing of the trigger signal by performing an exclusive-OR operation for, among the plural synchronization flip-flops, an output of the last synchronization flip-flop and an output of the second last synchronization flip-flop.

* * * * *

UNITED STATES PATENT AND TRADEMARK OFFICE
CERTIFICATE OF CORRECTION

PATENT NO. : 7,602,868 B2
APPLICATION NO. : 11/341605
DATED : October 13, 2009
INVENTOR(S) : Tsuiki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this

Fifth Day of October, 2010

David J. Kappos
*Director of the United States Patent and Trademark Office*